United States Patent
Leroux et al.

(10) Patent No.: US 12,211,681 B2
(45) Date of Patent: Jan. 28, 2025

(54) METHOD FOR DETERMINING THE INTEGRITY OF A DEPOSIT OF A COMPLEX BASED ON A BIOLOGICAL SAMPLE AND SYSTEM FOR CARRYING OUT SAID METHOD

(71) Applicant: bioMérieux, Marcy l'Etoile (FR)

(72) Inventors: Denis Leroux, Trevoux (FR); Jean-Philippe Charrier, Tassin la Demi Lune (FR); Régis Montvernay, Lyons (FR); Philippe Wandels, Lyons (FR)

(73) Assignee: BIOMERIEUX, Marcy l'Etoile (FR)

( * ) Notice: Subject to any disclaimer, the term of this patent is extended or adjusted under 35 U.S.C. 154(b) by 431 days.

(21) Appl. No.: 17/789,706

(22) PCT Filed: Jan. 13, 2021

(86) PCT No.: PCT/FR2021/000002
§ 371 (c)(1),
(2) Date: Jun. 28, 2022

(87) PCT Pub. No.: WO2021/144518
PCT Pub. Date: Jul. 22, 2021

(65) Prior Publication Data
US 2023/0038558 A1 Feb. 9, 2023

(30) Foreign Application Priority Data
Jan. 14, 2020 (FR) ...................................... 2000282

(51) Int. Cl.
*H01J 49/00* (2006.01)
*H01J 49/16* (2006.01)
*H01J 49/40* (2006.01)

(52) U.S. Cl.
CPC ........ *H01J 49/0004* (2013.01); *H01J 49/164* (2013.01); *H01J 49/40* (2013.01)

(58) Field of Classification Search
CPC ...... H01J 49/0004; H01J 49/164; H01J 49/40; H01J 49/0418; G01N 21/31; G01N 1/28; G01N 2021/1765; G01J 3/2823
See application file for complete search history.

(56) References Cited

U.S. PATENT DOCUMENTS

| 7,291,835 B2 | 11/2007 | Overney |
| 2013/0302847 A1 | 11/2013 | Mix |
| 2016/0314954 A1 | 10/2016 | Schmid et al. |

FOREIGN PATENT DOCUMENTS

WO 2006/116166 A2 11/2006

OTHER PUBLICATIONS

Apr. 19, 2021 Search Report issued in International Patent Application No. PCT/FR2021/000002.
(Continued)

*Primary Examiner* — David A Vanore
(74) *Attorney, Agent, or Firm* — Oliff PLC (57) ABSTRACT

A method for determining the integrity of at least one complex based on at least one biological sample and at least one matrix, including at least the following steps:—acquiring at least one image,—analyzing the image sent by extracting light intensity values representative of at least one spectral band,—relating the light intensity values to one another to obtain representative spectral data,—determining a state of integrity of the complex by comparing each of the representative spectral data by similarity grouping with a determined similarity threshold,—triggering at least one first alert, by the analysis unit, when the representative data are similar to the first state of integrity or to the second state of integrity.

13 Claims, 7 Drawing Sheets

(56) References Cited

OTHER PUBLICATIONS

Apr. 19, 2021 Written Opinion of the International Searching Authority issued in International Patent Application No. PCT/FR2021/000002.

METHOD FOR DETERMINING THE INTEGRITY OF A DEPOSIT OF A COMPLEX BASED ON A BIOLOGICAL SAMPLE AND SYSTEM FOR CARRYING OUT SAID METHOD

The present invention relates to the field of microbiology, and particularly to the characterization of microorganisms obtained from a sample, using mass spectrometry. More particularly, the invention relates to a system of analysis and a method for determining the integrity of complexes on the basis of samples for analysis by SELDI-TOF (Surface Enhanced Laser Desorption Ionization—Time of Flight) or MALDI-TOF (Matrix Assisted Laser Desorption Ionization—Time of Flight) mass spectrometry.

In the present invention, "complex" is taken to mean the combination of at least one microorganism present in a biological sample that has been taken and at least one matrix, where the microorganism may be a bacterium, a virus, a yeast, a mold, a fungus, etc., and the matrix may be alpha-cyano-4-hydroxycinnamic acid (HCCA), 3,5-dimethoxy-4-hydroxycinnamic acid (or sinapinic acid, SA), 2,5-dihydroxybenzoic acid (DHB), β-carboline (9H-pyrido[3,4-b]indole) (or Norharmane), or any other known substance for ionizing the complex in a MALDI-TOF analysis. In the particular case of microorganisms that are yeasts, the complex also comprises formic acid.

The deposition of a complex on a support to be analyzed by mass spectrometer, that is to say the deposition of a sample followed by the deposition of a matrix, is executed manually at present. Qualitative inconsistencies have been found in this deposition.

This is because the complex is sometimes incomplete, owing to the absence of the deposit of a sample or of the matrix, or even of both components, and makes the mass spectrum unusable, the deposition method commonly being executed manually and in a non-standardized way.

This finding is rather alarming, and solutions exist for remedying the total absence of complex, for example the solution proposed by the document U.S. Pat. No. 7,291,835, which describes a system for automatic monitoring of the complex reception area for a mass spectrometer using an ionization source of the MALDI type. The system described in the document U.S. Pat. No. 7,291,835 is an automatic flow system configured for identifying the optimal positioning for the laser impact for the purpose of ionizing the complex deposited on a MALDI plate support; the detection of the presence of a complex is therefore essential for the purpose of determining where to position the laser, especially as the receiving areas are very close together and thus difficult to separate.

Up to the present time, there has been no solution for the finer detection of the degree of completeness of the complex or for alerting the technician in good time so that he can correct or at least identify the receiving areas that exhibit a fault due to the absence of one or more components of the complex, which gives rise to false results and may therefore lead to incorrect diagnosis.

The object of the invention is to overcome some or all of the aforementioned drawbacks, and notably to provide monitoring of the quality, and hence the integrity, of each complex deposited on a support such as a MALDI-TOF plate, comprising a plurality of receiving areas in which a complex is deposited.

To this end, the invention proposes a method for determining the integrity of at least one complex based on at least one biological sample and at least one matrix, said complex being arranged in at least one reception area of a support to be analyzed subsequently, said method being implemented by a determination system comprising at least one imager and an analysis unit configured for interacting with the imager, characterized in that said method comprises at least the following steps:

acquiring at least one image of at least one receiving area of the support, the acquisition being executed by the imager of the determination system, sending the at least one image acquired by the imager to the analysis unit, analyzing the sent image by extracting the light intensity values representative of at least one spectral band, the analysis being executed by the analysis unit, relating the light intensity values to each other to obtain representative spectral data, and obtaining said representative spectral data, determining, by the analysis unit, a state of integrity of the complex by comparing each of the representative spectral data by similarity grouping with a specified similarity threshold of each of the representative spectral data obtained in the "relating" step with reference spectral data contained in the analysis unit (30) and identified for each state of integrity from among at least the following:

(i) a first state of integrity corresponding to the presence of a sample deposit combined with the absence of a matrix deposit, (ii) a second state of integrity corresponding to the presence of a matrix deposit combined with the absence of a sample deposit, (iii) a third state of integrity corresponding to the presence of a sample deposit combined with the presence of a matrix deposit, triggering at least a first alert, by the analysis unit, when the representative data resemble the first state of integrity or the second state of integrity.

Thanks to this method, it is easy to identify the receiving areas in which there is an incomplete complex, to complete the complex if this is still possible, or at least to isolate these receiving areas so that they are not taken into account for the rest of the analysis.

In the present invention, "integrity of the complex" is taken to mean the degree of completeness of the complex; a complex that is complete/entire has at least one deposit of biological sample and at least one deposit of a fluid called a matrix.

According to a characteristic of the invention, in the acquisition step, the imager acquires a plurality of images of at least the receiving area of the support, acquisition of the images being executed at different specified instants or in at least one specified period of time. By acquiring a plurality of images it is possible to provide finer identification after the steps of depositing each component of the complex. This acquisition is all the more advantageous when it is executed over a period of time, that is to say in a kinetic manner, making it possible to capture variations of states and to complete the deposits in real time if they have been omitted.

According to a characteristic of the invention, the imager is an RGB imager or a multi-spectral imager or a hyper-spectral imager. The imager may be of a different kind, the advantage of an RGB imager being that the spectral channels are already determined and this type of imager is inexpensive. The advantage of a multi-spectral or hyper-spectral imager is that the "selected" channels may be different from the RGB channels and may also be more numerous, given that the classification performance rate rises as more channels are selected.

According to a characteristic of the invention, the list comprising the states of integrity comprises at least a fourth state of integrity corresponding to the absence of a complex, that is to say the absence of a sample deposit combined with the absence of a matrix deposit. This function makes it possible to distinguish an empty receiving area from a receiving area with a deposit, thus enabling the empty receiving area to be disregarded in the analysis of the results, or enabling this area to be filled.

According to a characteristic of the invention, the acquisition of at least one image is executed by manual or automatic triggering. Thus manual triggering makes it possible to monitor the image capture and to ensure that the acquisition of the image has been executed at the specified time. Automatic triggering is calibrated in time, enabling the image capture to be automated and simplifying and reducing the number of manipulations for the operator. In particular, according to a characteristic of the invention, the frequency of acquisition of at least one image is calculated as a function of the time required to deposit the sample and the time required to deposit the matrix.

According to a characteristic of the invention, the triggering of the image acquisition may be semi-automatic. For example, the triggering is executed or initiated on the completion of a specified action, for example the scanning of an identifier such as a barcode.

According to a characteristic of the invention, the triggering of the image acquisition may be executed by the detection of the interruption of a light signal or by the detection of variations, using a piezoelectric sensor for example.

According to a characteristic of the invention, the method comprises a step of triggering a second alert which is different from the first alert, the second alert being triggered when the representative data resemble the third state of integrity, enabling the steps of the method of depositing the complex to be validated before the support is inserted into the mass spectrometer for analysis.

According to a characteristic of the invention, the triggering of the second alert causes the image acquisition to stop when the latter is executed for a specified period, unless the analysis unit is aware of another complex deposition in progress on the support. This is because it is possible to deposit a plurality of samples obtained from different origins onto the same support, and therefore a plurality of depositions will be in progress simultaneously. In this case, the image acquisition continues until all of the depositions have been terminated or are considered to have been terminated by the analysis unit.

Alternatively, the triggering of the second alert causes the acquisition of an image, if the latter action is executed at specific instants, and particularly at the end of the method for preparing the support.

According to a characteristic of the invention, the method comprises a step of triggering a third alert which is different from the first alert and the second alert, the third alert being triggered when the representative data resemble the fourth state of integrity. This third alert may be used to warn the operator that the receiving areas of the support are empty and that this defect may be remedied. Advantageously, in the case of continuous image acquisition, the third alert is triggered only when the analysis unit receives information of the execution of a complex deposition when said analysis unit determines the fourth state of integrity.

According to a characteristic of the invention, the method comprises a calibration step before the acquisition step of the method, the calibration step consisting in the acquisition of an image, called the reference image, of the at least one receiving area, for each state of integrity to be referenced.

This calibration step enables the method to be adapted to different experimental conditions, since it allows a reference frame to be defined in situ. Additionally, the calibration step is, notably, used in the determination of each state of integrity and of the reference spectral data relating thereto, which are implemented in the analysis unit before the determination method according to the invention is implemented.

For example, for the fourth state of integrity, a reference image of the empty receiving area is acquired. For the first state of integrity, a reference image with a deposit of the sample only is acquired. For the second state of integrity, a reference image with a deposit of the sample only is acquired, and for the third state of integrity an image with a deposit of sample completed with a deposit of a matrix is acquired.

When the matrix is deposited in the receiving area, a drop is formed on the surface of the receiving area. The degree of wetting, corresponding to the degree of spread of the liquid over this solid, varies according to the surface energy of the receiving area. At constant volume, the projected diameter of a drop deposited on a "less wettable" surface, corresponding to a large contact angle (low surface energy) is smaller than the projected diameter of a drop deposited on a "more wettable" surface, corresponding to a small contact angle (high surface energy).

To quantify the quality of the wetting, the projected diameter in the plane of the receiving area is measured (the drops being deposited at constant volume).

According to a characteristic of the invention, the diameter of a drop of a complex according to the third state of integrity is greater than the diameter of a drop of a complex according to the second state of integrity. The contact surface is determined by Young's law, which enables a contact angle to be determined on the basis of the surface energies of the solid 's' (the receiving area) and of the liquid 'l' (the matrix). The measurement of the diameter is an indirect measurement which is simpler to make than the measurement of the contact angle.

Without being tied to the interpretation, we can explain this behavior by the high surface energy of the sample forming a film of bacteria (charged and hydrophilic) by comparison with the receiving areas that are free of bacteria (more hydrophobic, polymer material of the MALDI receiving plate).

According to a characteristic of the invention, the determination method comprises a step of determining the second state of integrity by measuring the projected diameter of the drop of the complex present in the receiving area of the support.

According to a characteristic of the invention, the determination method may comprise a preliminary substep of measuring the diameter of the drop of the complex present in the receiving area of the support in the absence of a deposit of sample, in the second state of integrity (0M), and a preliminary substep of comparing the measured diameter with a reference diameter corresponding to the diameter of a drop of a complex having a third state of integrity (BM), said substeps being executed before the step of determining the second state of integrity by measuring the contact angle. This is because the second state of integrity (0M) may be distinguished from the complex of the other states of integrity by the measurement of the projected diameter of the drop of deposit in addition to, or in place of, the measurement of the diameter of the contact angle.

In the present invention, the contact angle of the drop is measured by the Young-Laplace equation as follows:

[Math 1] Young-Laplace equation:

$$\cos\theta = \frac{\sigma_{Sv} - \sigma_{Sl}}{\sigma_{lv}}$$

Where θ is the contact angle between the ambient air, the drop of complex and the support, expressed in degrees,
  $\sigma_{sv}$ represents the interface energy between the air and the support, expressed in millinewtons/m or in dynes/cm,
  $\sigma_{sl}$ represents the interface energy between the drop and the support, expressed in millinewtons/m or in dynes/cm, and
  $\sigma_{lv}$ represents the interface energy (interface tension) between the drop and the ambient air, expressed in millinewtons/m or in dynes/cm.

Advantageously, the method for determining integrity is used in a method for preparing a support for the purpose of analysis, by mass spectrometer for example, in order to detect the nature of the microorganism(s) present in the sample(s) deposited on the support.

The invention also proposes a method for preparing a support for purposes of analysis, by mass spectrometer for example, in order to detect the nature of the microorganism(s) present in the sample(s) deposited on the support, the preparation method comprising at least the following steps:
  depositing a biological sample in at least one reception area of the support;
  depositing a matrix in the at least one reception area of the support in which the sample has been deposited;
  the preparation method being characterized in that in incorporates a method for determining the integrity of the complex according to the invention.

According to a characteristic of the invention, each deposition is a deposition of a layer of sample or matrix.

According to a characteristic of the invention, the step of acquiring at least one image of the determination method is executed after the step of depositing the matrix.

Alternatively, according to a characteristic of the invention, the step of acquiring at least one image of the determination method is executed after the step of depositing the sample and after the step of depositing the matrix.

Alternatively, according to a characteristic of the invention, the step of acquiring at least one image of the determination method is triggered before the step of depositing the sample and is stopped after the step of depositing the matrix, the acquisition step being executed continuously during the steps of the preparation method.

According to a characteristic of the invention, at each step of sample or matrix deposition on the receiving area, the operator may manually notify information of execution to the analysis unit, the step of acquiring at least one image being executed after this notification.

The invention also proposes a system for implementing the method according to the invention, comprising at least one imager, an analysis unit and at least one display device configured for displaying the alert(s).

The display device is also configured for displaying a graphic representation of the support, illustrating the at least one receiving area of the support, and preferably all the receiving areas of the support.

According to a characteristic of the invention, the system comprises a guidance device interacting with the display device, the guidance device being integrated into the analysis unit, the guidance device being configured for indicating the receiving area(s) designated for the deposition of a sample and/or a matrix.

According to a characteristic of the invention, the guidance device is configured for interacting with the imager.

According to a characteristic of the invention, the guidance device is configured for indicating, via the display device, the receiving area that is to be filled or topped up, as a function of the state of progress of the preparation method and of the method of integrity determination. This guidance device may be used to guide the operator from step to step with monitoring, preferably in real time, which is, notably, possible when a plurality of images are acquired according to the integrity determination method, either at specified times or over a specified period. The guidance device also makes it possible to ensure that the support is entirely ready before analysis in the mass spectrometer.

According to a characteristic of the invention, the notification of the information of execution of a deposit is provided via the guidance device interacting with the analysis unit.

Advantageously, when a complex is categorized according to the first state of integrity or the second state of integrity, the guidance device indicates to the operator via the display device the receiving area of the support that requires intervention, the intervention possibly being either the correction of the error or the isolation of the receiving area, as the case may be.

In a first case, if the acquisition step of the integrity determination method is executed over a specified period in real time, then the operator may correct the absence of a matrix (second state of integrity) or identify the absence of a sample (first state of integrity), and disregard this in the subsequent analysis.

In a second case, if the acquisition step of the integrity determination method is executed after each deposition step, it is easy to correct the missing deposition step as the case may be, or to identify the absence of a sample (first state of integrity), and to disregard this in the subsequent analysis.

In a third case, if the acquisition step of the determination method is executed after the sample deposition and the matrix deposition are assumed to have been executed, then the operator identifies the defective receiving areas and disregards them in the subsequent analysis of the microorganism(s).

According to a characteristic of the invention, the indications of the guidance device via the display device are represented by indicators of specified geometrical shapes and/or indicators of specified colors.

For example, for an empty receiving area that is to be filled with a matrix deposit, the receiving area will have a green circular indicator (for example) on the graphic representation displayed on the display device, so that the operator can easily identify the receiving area to be filled. Additionally, for example, if the sample deposit is absent or poorly executed, the corresponding receiving area will have a red circular indicator (for example), indicating that the deposit must be remade or that said receiving area must be isolated to remove it from the receiving areas to be analyzed subsequently.

According to a characteristic of the invention, the imager comprises a spectral channel, or preferably at least two spectral channels. For example, a first spectral channel corresponds to a first spectral band from 410 nm to 427 nm, and a second spectral channel corresponds to a second spectral band from 761 nm to 786 nm.

According to a characteristic of the invention, the imager of the system is configured for reading a one-dimensional or two-dimensional barcode, or QR Code, image.

According to a characteristic of the invention, the imager of the system is also configured for acquiring an image of a Petri dish so as to correlate the microorganism of the analyzed sample on the support with the Petri dish from which it comes.

According to a characteristic of the invention, the support comprises a plurality of reception areas, for example forty-eight receiving areas. Thus up to forty-eight samples of different origin may be deposited.

The invention will be more readily understood with the aid of the following description, which relates to some preferred embodiments of the present invention, provided by way of non-limiting example and explained with reference to the attached schematic drawings. The attached schematic drawings are listed below.

In the context of a method for preparing a sample support according to the invention for the purpose of analysis, by mass spectrometer for example, a sample support in the form of a card having a plurality of receiving areas, called "wells", is used. A drop of a sample containing one or more microorganisms to be identified, for example, and at least one drop of matrix are usually deposited in each well. In the particular case of yeast identification, a drop of formic acid may be added between the sample deposition and the matrix deposition. The final deposit is called a "complex", and therefore comprises at least one layer of sample and one layer of matrix.

Before proceeding to the analysis and identification of the microorganism(s) in the sample, a method of determining the integrity of the complex is executed according to the invention, in order to check whether the preparation of the support has been executed appropriately, to avoid any incorrect results. Regardless of the mode of execution of the preparation method according to the invention, the determination method according to the invention is implemented by a system 1 shown in FIGS. 8 and 9.

Figure 8:
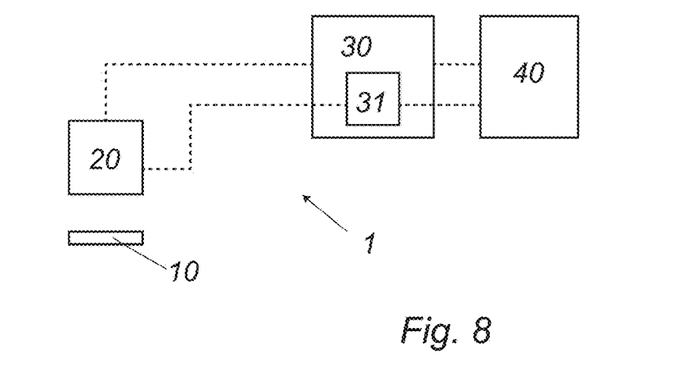
FIG. 8 is a schematic view of the system according to the invention.
Figure 9:
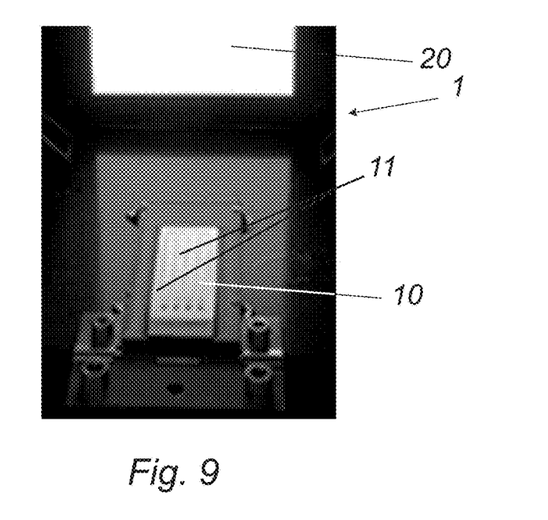
FIG. 9 is a partial illustration of the system according to the invention shown in FIG. 8.

According to the invention, the system 1 comprises at least one imager 20, an analysis unit 30 and at least one display device 40 configured for displaying the alert(s) and transmitting them to the operator. The display device 40 is configured for displaying a graphic representation of the support 10, illustrating the at least one receiving area 11 of the support 10, and preferably all the receiving areas 11 of the support 10.

As shown in FIG. 8, notably, the system 1 comprises a guidance device 31 interacting with the display device 20 and with the display device 40, the guidance device 31 being integrated into the analysis unit 30.

The guidance device is configured for indicating the receiving area(s) 11 of the support 10 in which a sample and/or a matrix is to be deposited, and also for providing an alert via the display device 40 showing which receiving area 11 is to be filled or topped up, on the basis of the state of progress of the preparation method and the method of integrity determination.

Figure 10:
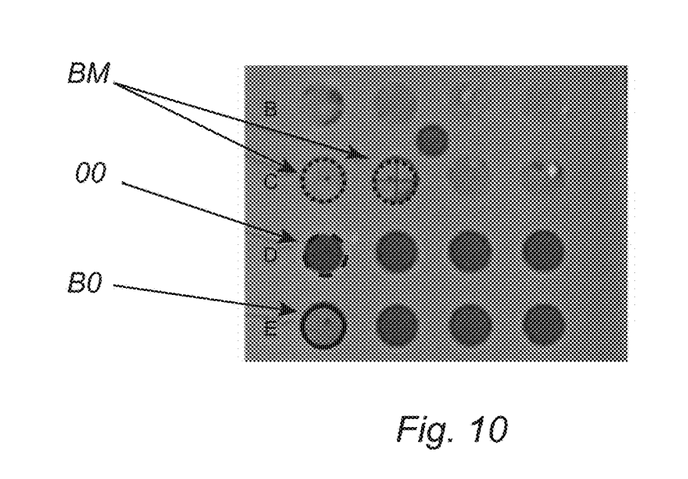
FIG. 10 is a representative view of the sample support via the display device.

As may be seen in FIG. 10, the guidance device 31 enables the operator to be guided from step to step with monitoring, preferably in real time, which is, notably, possible when a plurality of images are acquired according to the integrity determination method, either at specified times or over a specified period. As may be seen in FIG. 8, the guidance device may alert the operator via graphic indicators on the representation of the support displayed on the display device 40. In the illustrated example, the guidance device 31 indicates to the operator, by a ring of closely spaced dots, that the two receiving areas in line C comprise complexes having a third state of integrity (BM); it also indicates that, on line D, the first reception area is empty (fourth state of integrity 00) and is ready to receive a sample deposit (ring of widely spaced dots) and that, on line E, the first reception area has a complex whose state of integrity corresponds to the first state of integrity (B0) and is therefore ready to receive a deposit of matrix or formic acid (continuous ring).

The method of determination and the method of support preparation will now be described with reference to FIGS. 1 to 3B.

Figure 1:
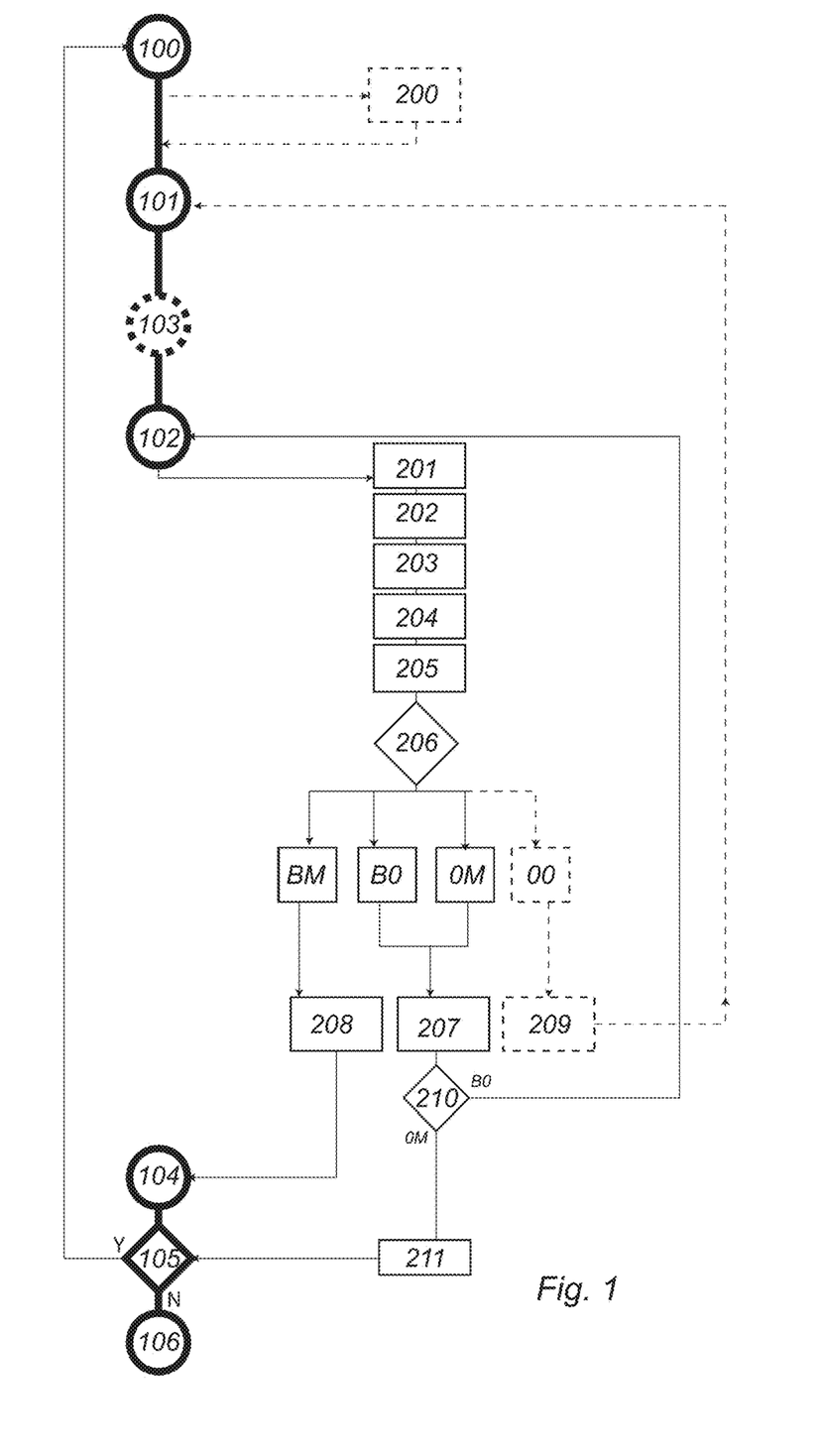
FIG. 1 is a schematic view of the preparation method according to a first embodiment.

In a first embodiment shown in FIG. 1, the method of integrity determination is executed after steps 101, 102, and 103 of depositing a sample, a matrix, and if necessary formic acid, respectively. Said method of integrity determination in the first embodiment comprises a step 201 of capturing at least one image of the sample support, and more particularly an image of at least one reception area. The captured image is then sent (step 202) to the analysis unit of the system. The analysis unit then analyzes the image by extracting values of light intensity representative of at least one spectral band (step 203), relates the light intensity values to each other for the purpose of obtaining representative spectral data (step 204), and obtains said representative spectral data (step 205). By comparing (step 206) each of the representative spectral data obtained in the preceding step with reference spectral data, the analysis unit determines a state of integrity of the complex contained in the at least one receiving area. It should be noted that the reference spectral data are contained in the analysis unit, and are each identified for a state of integrity among at least: (i) a first state of integrity (B0) corresponding to the presence of a sample deposit combined with the absence of a matrix deposit, (ii) a second state of integrity (0M) corresponding to the presence of a matrix deposit combined with the absence of a sample deposit, (iii) a third state of integrity (BM) corresponding to the presence of a sample deposit combined with the presence of a matrix deposit.

Following the determination of the state of integrity of the complex, the analysis unit sends a corresponding alert.

A first alert is sent to the operator (step 207) when the analysis unit determines that the complex has a state of integrity corresponding to the first state of integrity or to the second state of integrity. This is because the complex is considered to be incomplete, and the operator must be aware of this. Following this first alert, a step of differentiation (step 210) of the state of integrity is executed to enable the operator to know whether it is an absence of matrix deposit or an absence of sample deposit that has been detected. For this differentiation step, either a finer analysis of the spectral bands is performed, or, alternatively, the contact angle of the drop of the complex deposited on the receiving area may be measured.

Figure 7:
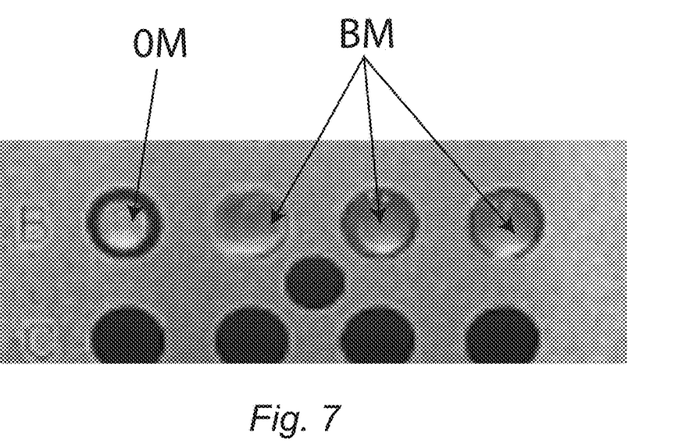
FIG. 7 is a partial photograph of the support illustrating deposited complexes having different states of integrity.

FIG. 7 shows deposits of complexes having different states of integrity. It can be seen that in the first receiving area on line B there is a deposit of complex having a second state of integrity (0M), and in the other three receiving areas on line B there are deposits of complex having a third state of integrity (BM). It will be apparent that the drop of the complex having a second state of integrity (0M) has a smaller diameter than that of the drops of the complex having a third state of integrity (BM). It should be noted that the diameter observed after the deposition of the matrix on the unused deposition area is about 70% of the nominal value of the diameter observed after the deposition of the matrix on the sample that forms a bacterial film.

If it is determined that the matrix deposit is missing (first state of integrity B0), the operator may remedy the omission by depositing said matrix by returning to step 102, after which the determination method is repeated to ensure that step 102 has been correctly executed and that the complex is complete (step 104). If it is determined that the sample deposit is missing (second state of integrity 0M), the operator identifies the defective receiving areas on the display device of the analysis unit, and isolates them (step 211) so that they are disregarded in the subsequent analysis. It should be noted that the isolation of the defective areas (step 211) triggers the rest of the procedure, that is to say the decision step 105 and, depending on the decision, either step 106 of concluding the support preparation method or step 100 of initialization.

A second alert is sent to the operator (step 208) when the analysis unit determines that the complex has a state of integrity corresponding to the third state of integrity. This is because the complex is considered to be complete (step 104), and the operator must be aware of this in order to move on to the rest of the method. Optionally, and as shown in dotted lines, the determination method may determine a fourth state of integrity (00) of the complex corresponding to the absence of a sample deposit and the absence of a matrix deposit. This fourth state of integrity (00) is notified to the operator by a third alert (step 209). The operator may remedy the omission by returning to step 101, after which the determination method is repeated to ensure that the complex is complete (step 104).

Optionally, a calibration step 200 may be executed before the sample deposition (step 101).

Figure 2:
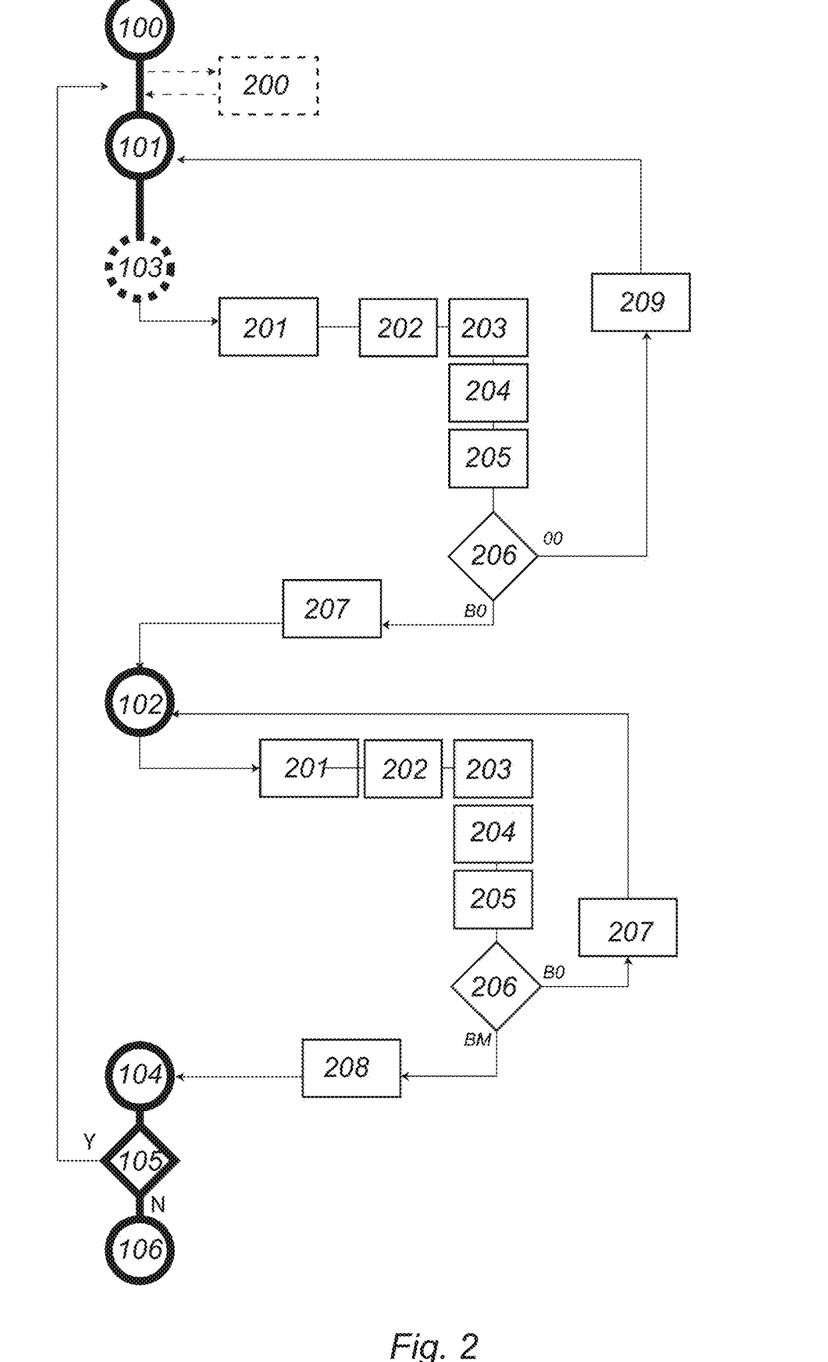
FIG. 2 is a schematic view of the preparation method according to a second embodiment.

In a second embodiment shown in FIG. 2, the integrity determination method is triggered; more precisely, the step 201 of acquiring at least one image of the support, and more particularly of at least one reception area, is triggered after the first step 101 of depositing a sample, or after the step of depositing formic acid 103 if appropriate. The captured image is then sent (step 202) to the analysis unit of the system. The analysis unit then analyzes the image by extracting values of light intensity representative of at least one spectral band (step 203), relates the light intensity values to each other for the purpose of obtaining representative spectral data (step 204), and obtains said representative spectral data (step 205). By comparing (step 206) each of the representative spectral data obtained in the preceding step with reference spectral data, the analysis unit determines a state of integrity of the complex contained in the at least one receiving area. It should be noted that the reference spectral data are contained in the analysis unit, and are each identified for a state of integrity among at least: (i) a first state of integrity (B0) corresponding to the presence of a sample deposit combined with the absence of a matrix deposit, (ii) a fourth state of integrity (00) corresponding to the absence of a sample deposit combined with the absence of a matrix deposit. Following the determination of the state of integrity of the complex, the analysis unit sends a corresponding alert: either a first alert (step 207) indicating a first state of integrity (B0) because only step 101 has been executed at this stage, or a third alert (step 209) indicating a fourth state of integrity (00) so that the step of sample deposition (step 101) is executed again, steps 101, 103, 201, 202, 203, 204, 205 and 206 being executed because the third alert (step 209) is triggered. When the first state of integrity (B0) has been determined, the second step (102) of depositing a matrix is triggered. Steps 201, 202, 203, 204, 205 and 206 are then executed, so that the analysis unit determines the state of integrity of the complex: this state is either the first state of integrity (B0), when the first alert is triggered (step 207) to return to the step of matrix deposition (step 102) and the following steps 201, 202, 203, 204, 205 and 206, or the third state of integrity (BM), when a second alert (step 208) is triggered, indicating that the complex is complete (step 104), which triggers the decision step 105 and, depending on the decision, either step 106 of concluding the support preparation method or step 100 of initialization.

In the first embodiment (FIG. 1) and the second embodiment (FIG. 2), the step of acquisition of image(s) (step 201) is executed on a one-off basis, but in the first embodiment it is executed when the complex has been deposited, while in the second embodiment it is executed after each deposition step forming the complex. The second embodiment is more advantageous, because it allows errors to be rectified more easily.

Figure 3A:
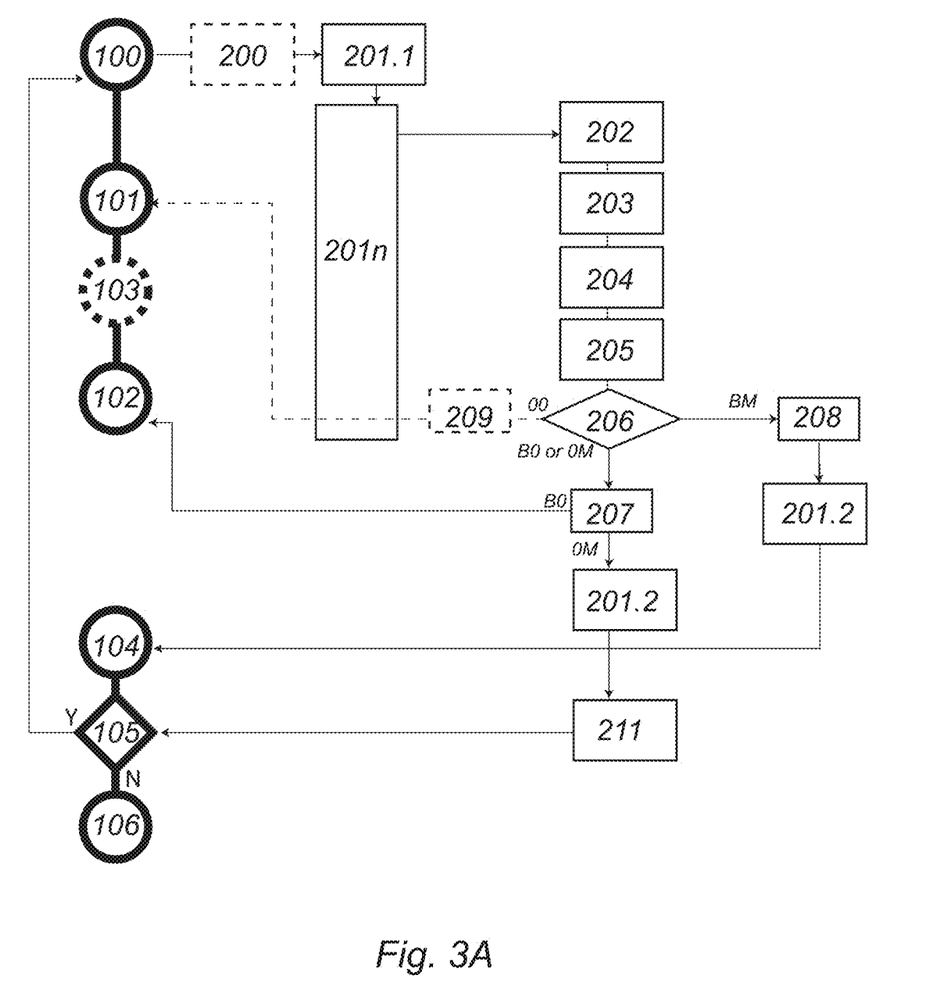
FIG. 3A is a schematic view of the preparation method according to a third embodiment.

In a third embodiment shown in FIG. 3, the determination method is triggered at step 100 of initialization of the method for preparing the support. The step of acquiring at least one image (step 201) is executed continuously during the steps of sample deposition (101), formic acid deposition (103) if appropriate, and matrix deposition (102). The start of acquisition is illustrated by step 201.1, step 201n representing the plurality of image acquisitions in the course of steps 101, 102, 103. After each image acquisition (201n), steps 202 to 206 are executed: if the complex has a state of integrity corresponding to the third state of integrity (BM), then the acquisition step (201n) stops (step 201.2), the analysis unit considers the complex to be complete (step 104), and step 105 is implemented.

If the complex has a state of integrity corresponding to the first (B0) or second state of integrity (0M), then the first alert is triggered (step 207), or if, optionally, the state is a fourth state of integrity (00), then the third alert is triggered (step 209), and then, in a first case, the operator decides to isolate the defective receiving area (step 211), the image acquisition (201n) stops (step 201.2), and step 105 is implemented; in a second case, the operator decides whether to correct the error, if a first state of integrity (B0) is determined, the image acquisition continues (step 201n), and steps 202 to 206 of the determination are followed and step 102 of the support preparation method is executed again.

Figure 3B:
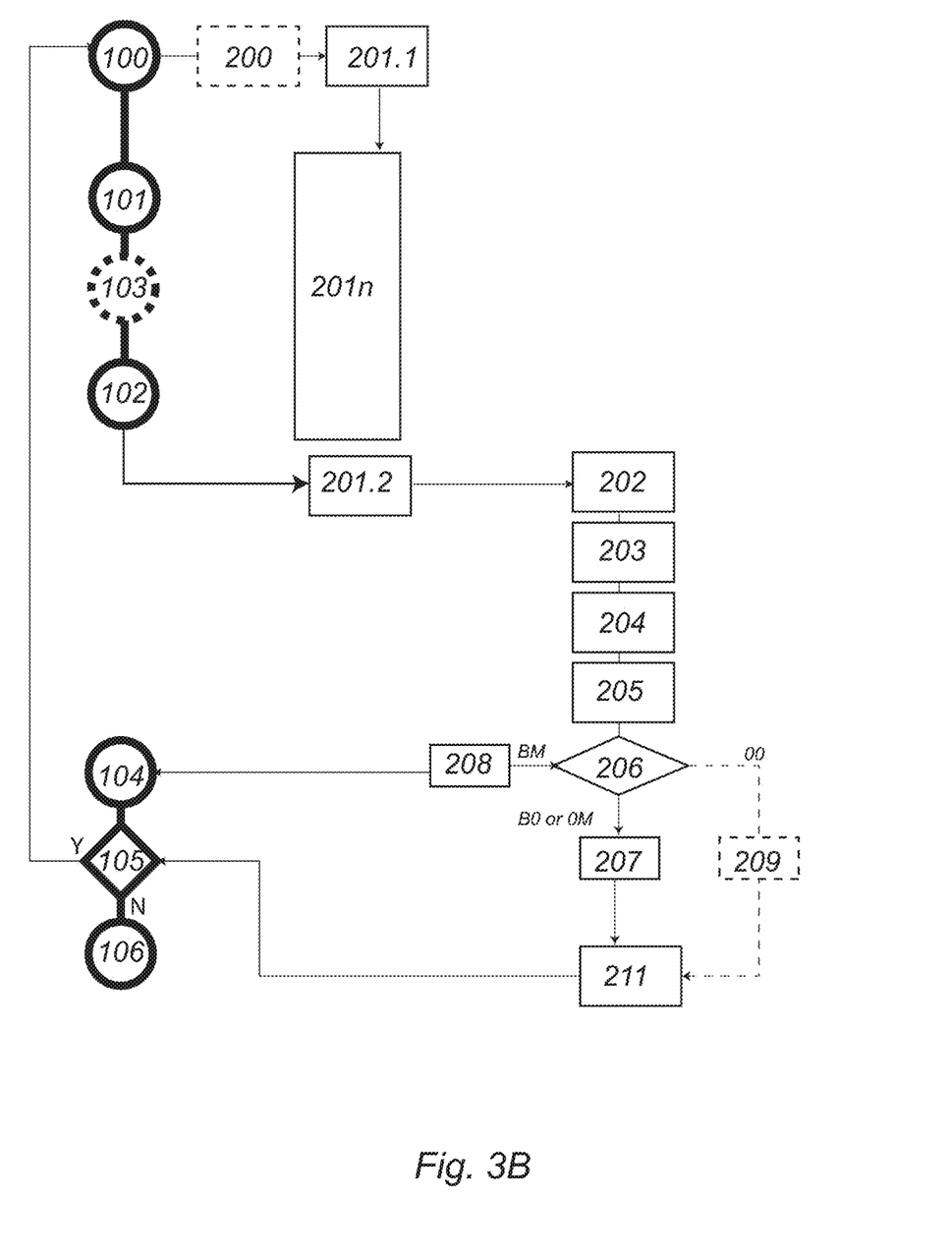
FIG. 3B is a schematic view of the preparation method according to a variant of the third embodiment.

In a variant of this third embodiment, as illustrated in FIG. 3B, after the step of matrix deposition (step 102), the image acquisition (201n) is stopped (step 201.2) and the analysis unit implements steps 202 to 206: if the complex has a state of integrity corresponding to the third state of integrity (BM), then the analysis unit considers the complex to be complete (step 104), and step 105 is implemented; in all other cases (states of integrity 00, B0, 0M), the operator decides to isolate the defective receiving area (step 211) and step 105 is implemented, as well as, depending on the decision, either step 106 of concluding the support preparation method or step 100 of initialization.

Figure 4:
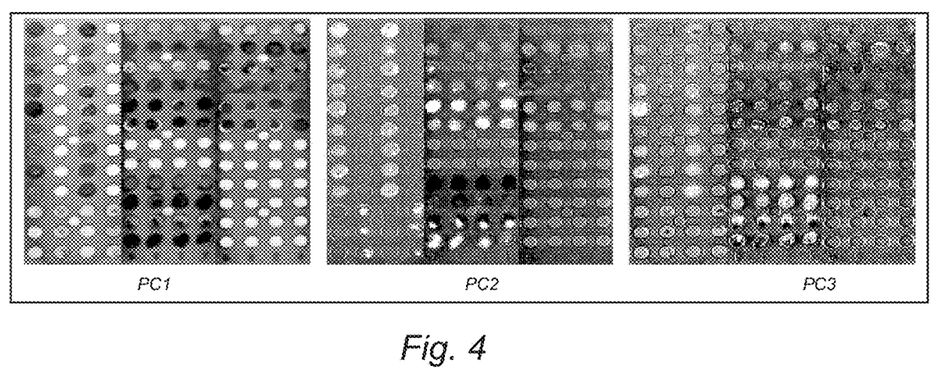
FIG. 4 is a series of black and white images of three sample supports according to the channels R (PC1), G (PC2), B (PC3)
Figure 5:
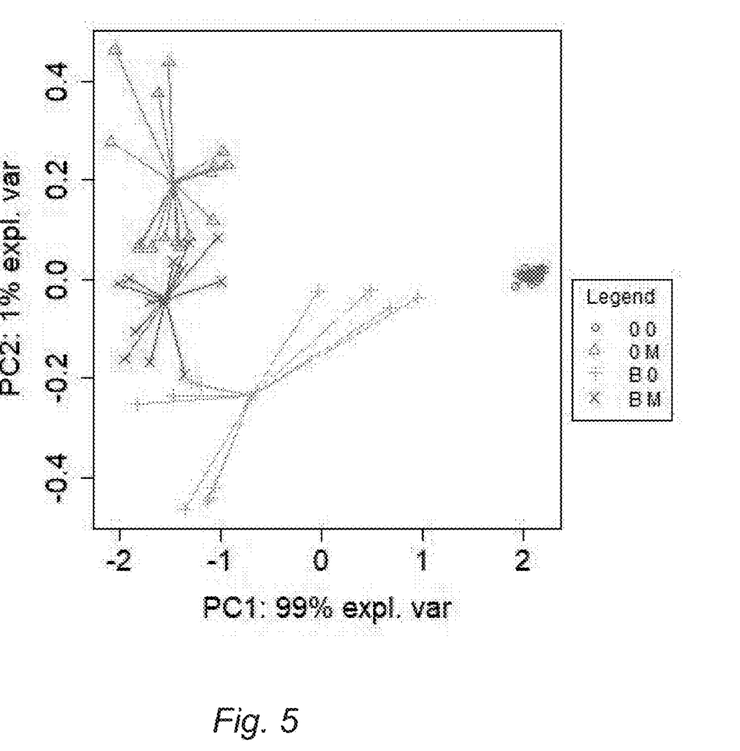
FIG. 5 is a graphic representation of the values of light intensity of the complexes of FIG. 4, after a principal component analysis.

The invention is illustrated with an example shown in FIGS. 4 and 5. This example is, evidently, non-limiting and enables the claimed approach to be understood more readily. In this example, three spectral channels R, G, B are used. FIG. 4 shows a series of images of three supports having deposits of different complexes. The first image of the three supports is an image according to the first channel R (PC1), the second image of the three supports is an image according to the second channel G (PC2), and the third image of the three supports is an image according to the third channel B (PC3). The images are in black and white. The different complexes are then identified by points whose coordinates (PC1; PC2; PC3) correspond to their light intensity values as a function of the chosen wavelengths (RGB). After principal component analysis, as shown in FIG. 5, the analysis unit of the system groups the different points by similarity in order to establish "groups" of states of integrity for them, the differentiation of the states of integrity being more obvious in this mode. However, it should be noted that the principal component analysis is not obligatory. As may be seen in FIG. 5, the empty receiving areas (absence of complex, equivalent to the fourth state of integrity 00) are separated from the batch and are represented by small circles, the complexes having a state of integrity equivalent to the first state of integrity B0 are represented by "+" signs, the complexes having a state of integrity equivalent to the second state of integrity 0M are represented by triangles, and the complexes having a state of integrity equivalent to the second state of integrity 0M are represented by crosses, "×".

Figure 6:
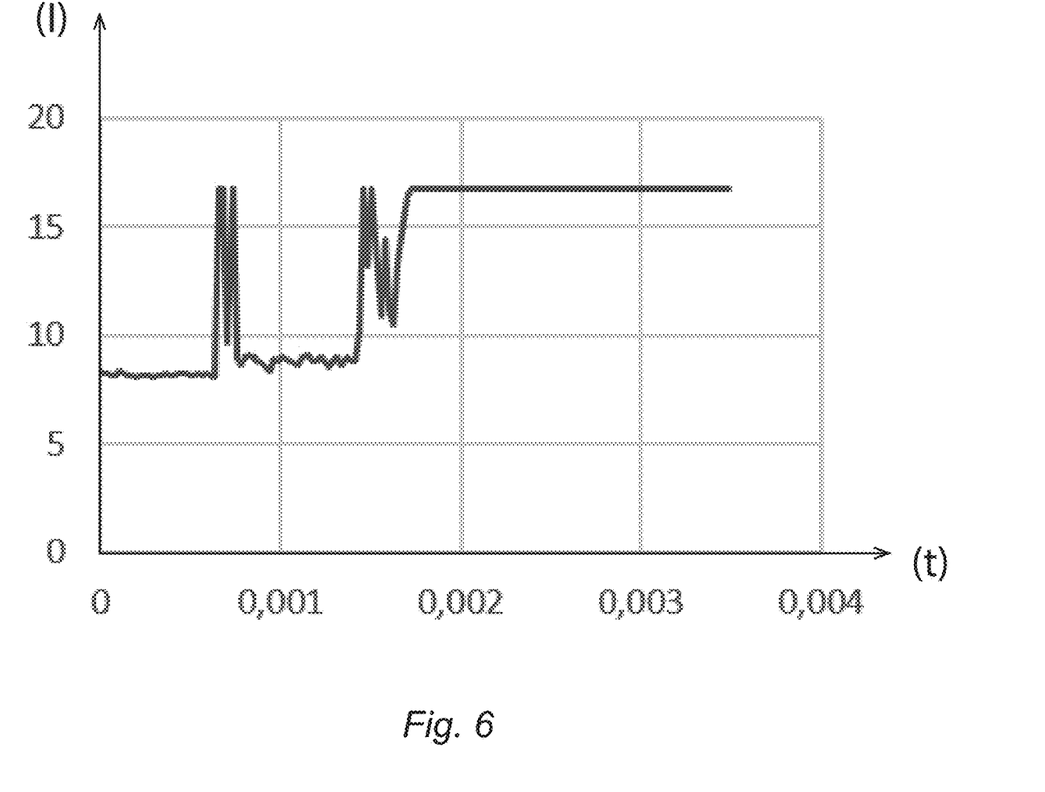
FIG. 6 is a graphic representation of the value of light intensity of a complex as a function of time according to a wavelength.

FIG. 6 shows a graphic representation of the light intensity values of a complex as a function of time according to a specified wavelength. In this graph, the first peak corresponds to the movement of the point of the deposition tool under the imager for depositing a sample. The difference in light intensity after this first peak is small. The second peak corresponds to the movement of a hand under the imager for depositing the matrix. The signal then reaches its maximum after the drying of the matrix, which becomes white as it crystallizes.

Clearly, the invention is not limited to the embodiments described and represented in the appended figures. Modifications may be made, notably in terms of the composition of the various elements, or by substitution of equivalent methods, without thereby departing from the scope of protection of the invention.

The invention claimed is:

1. A method for determining the integrity of at least one complex based on at least one biological sample and at least one matrix, the complex being arranged in at least one reception area of a support to be analyzed subsequently, the method being implemented by a determination system comprising at least one imager and an analysis unit configured for interacting with the imager, wherein the method comprises at least the following steps:
   acquiring at least one image of at least one receiving area of the support, the acquisition being executed by the imager of the determination system,
   sending the at least one image acquired by the imager to the analysis unit,
   analyzing the sent image by extracting the light intensity values representative of at least one spectral band, the analysis being executed by the analysis unit,
   relating the light intensity values to each other to obtain representative spectral data, and obtaining the representative spectral data,
   determining, by the analysis unit, a state of integrity of the complex, by comparing, by similarity grouping with a specified similarity threshold, each of the representative spectral data obtained in the "relating" step with reference spectral data contained in the analysis unit and identified for each state of integrity from among at least the following:
   (i) a first state of integrity corresponding to the presence of a sample deposit combined with the absence of a matrix deposit,
   (ii) a second state of integrity corresponding to the presence of a matrix deposit combined with the absence of a sample deposit,
   (iii) a third state of integrity corresponding to the presence of a sample deposit combined with the presence of a matrix deposit,
   triggering at least a first alert, by the analysis unit, when the representative data resemble the first state of integrity or the second state of integrity.

2. The determination method as claimed in claim 1, wherein the representative values of light intensity are representative of at least two different spectral bands.

3. The determination method as claimed in claim 1, wherein, in the acquisition step, the imager acquires at least one plurality of images of the same receiving area of the support, the acquisition of the images being executed at different specified instants or during at least one specified period of time.

4. The determination method as claimed in claim 1, wherein the imager is an RGB imager or a multi-spectral imager or a hyperspectral imager.

5. The determination method as claimed in claim 1, wherein the list comprising the states of integrity comprises at least a fourth state of integrity corresponding to the absence of a sample deposit combined with the absence of a matrix deposit.

6. The determination method as claimed in claim 1, comprising a calibration step before the acquisition step of the method, the calibration step consisting in the acquisition of an image, called the reference image, of the at least one empty receiving area and in the recording of the reference image in the analysis unit.

7. A method for preparing a sample support for purposes of analysis, by mass spectrometer for example, in order to detect the nature of the microorganism(s) present in the sample(s) deposited on the support, the preparation method comprising at least the following steps:
   depositing a biological sample in at least one reception area of the support,
   depositing a matrix in the at least one reception area of the support in which the sample has been deposited, the preparation method incorporates a method for determining the integrity of the complex as claimed in claim 1.

8. The preparation method as claimed in claim 7, wherein the step of acquiring at least one image of the determination method is executed after the step of depositing the matrix.

9. The preparation method as claimed in claim 7, wherein the step of acquiring at least one image of the determination method is executed after the step of depositing the sample and after the step of depositing the matrix.

10. The preparation method as claimed in claim 7, wherein the step of acquiring at least one image of the determination method is triggered before the step of depositing the sample and is stopped after the step of depositing the matrix, the acquisition step being executed continuously during the steps of the preparation method.

11. A system configured for implementing the determination method as claimed in claim 1, comprising at least one imager, an analysis unit and at least one display device configured for displaying the alert(s).

12. The system as claimed in claim 11, wherein the display device is configured for displaying a graphic representation of the support, illustrating the at least one receiving area of the support.

13. The system as claimed in claim 12, comprising a guidance device interacting with the display device, the guidance device being integrated into the analysis unit, the guidance device being configured for indicating the receiving area(s) designated for the deposition of a sample and/or a matrix.

* * * * *